Feb. 6, 1968  M. LEVA  3,367,638
GAS-LIQUID CONTACT APPARATUS
Filed Oct. 25, 1963  4 Sheets-Sheet 1

INVENTOR.
MAX LEVA
BY William W. Eger
ATTORNEY

Feb. 6, 1968   M. LEVA   3,367,638
GAS-LIQUID CONTACT APPARATUS
Filed Oct. 25, 1963   4 Sheets-Sheet 2

INVENTOR.
MAX LEVA
BY William McGee
ATTORNEY

Feb. 6, 1968 M. LEVA 3,367,638
GAS-LIQUID CONTACT APPARATUS
Filed Oct. 25, 1963 4 Sheets-Sheet 3

INVENTOR.
MAX LEVA
BY
*William N. Egan*
ATTORNEY

Feb. 6, 1968 M. LEVA 3,367,638
GAS-LIQUID CONTACT APPARATUS
Filed Oct. 25, 1963 4 Sheets-Sheet 4

INVENTOR.
MAX LEVA
BY
ATTORNEY

United States Patent Office 3,367,638
Patented Feb. 6, 1968

3,367,638
GAS-LIQUID CONTACT APPARATUS
Max Leva, 1030 Dallett Road, Pittsburgh, Pa. 15227
Filed Oct. 25, 1963, Ser. No. 318,912
3 Claims. (Cl. 261—113)

This invention relates to multiple-plate gas-liquid contact towers of the type wherein the plates are arranged in closely spaced relationship and designed to carry a relatively thin liquid film. A tower of this type is described, for example, in U.S. Patent No. 3,075,752 of Max Leva wherein typical interplate spacings of the order of 1″ to 4″ are employed. Since the contact plates in towers of this design carry only a relatively thin film of liquid, seldom greater than ¼ to ½″ in depth in contrast to many other plate towers wherein the liquid layer on the plates may be of the order of 4″ or more in depth, the contact plates may be made of relatively thin-gauge materials, and there is no necessity for heavy-duty structural supports for the individual plates.

While offering the advantage of relatively low liquid loading per plate and the corresponding possibility of a light-weight, inexpensive construction, contact towers of this type offer rather special construction problems because of the large number and relatively close spacing of the plates. One problem is that of avoiding gas and liquid bypassing between the tower shell and the periphery of the plates, resulting in decreased tower efficiencies. Ideally, this bypassing could be avoided by maintaining very close tolerances between the periphery of the plates and inner surfaces of the tower shell. This is impossible to achieve, however, in practice without inordinate costs; and accordingly, some means must be provided for sealing the periphery of the plates to prevent gas and liquid bypassing.

Another problem is the avoidance of any warping or other distortion of the relatively thin-gauge plates. This may occur if the plates are not sufficiently supported and anchored within the tower. Any substantial deviation of the plate surfaces from the horizontal as a result of warping or other distortion results in uneven distribution of the thin liquid film on the surface of the plate, decreasing tower efficiency. In this connection, it has been found that spot or seam welding of the plates to supporting members is generally not satisfactory in that it tends to cause warpage or other distortion of the plate surfaces.

Still a third problem, aggravated by the relatively large number and close spacing of the plates, is the necessity for providing a construction which may be readily assembled and disassembled without damage to the plates or supporting members to permit rapid and economical cleaning or other servicing.

In accordance with the present invention, a new and improved mode of plate assembly has been discovered which makes possible the use of thin-gauge plates and light-weight supporting structure while, at the same time, providing a satisfactory solution to all of the foregoing problems. Gas and liquid bypassing between the edge of the plates and the tower shell is eliminated. Adequate support for the plates is provided, particularly in their peripheral portions, eliminating the tendency for warping and other types of distortion. At the same time, a plate assembly is provided which may be easily and quickly installed and removed from the tower shell as a unit, and which may be quickly and easily taken apart, plate by plate, if desired, and reassembled with no damage to the individual plates or supporting elements.

For a better understanding of the invention, reference is now made to the accompanying drawings in which.

Figure 1:
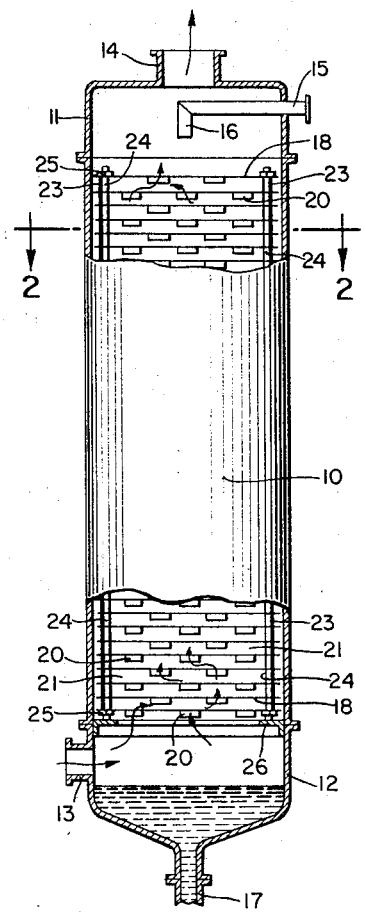
FIG. 1 is a side elevation, partly in section, of one embodiment of a gas-liquid contact tower constructed in accordance with the invention.
Figure 2:
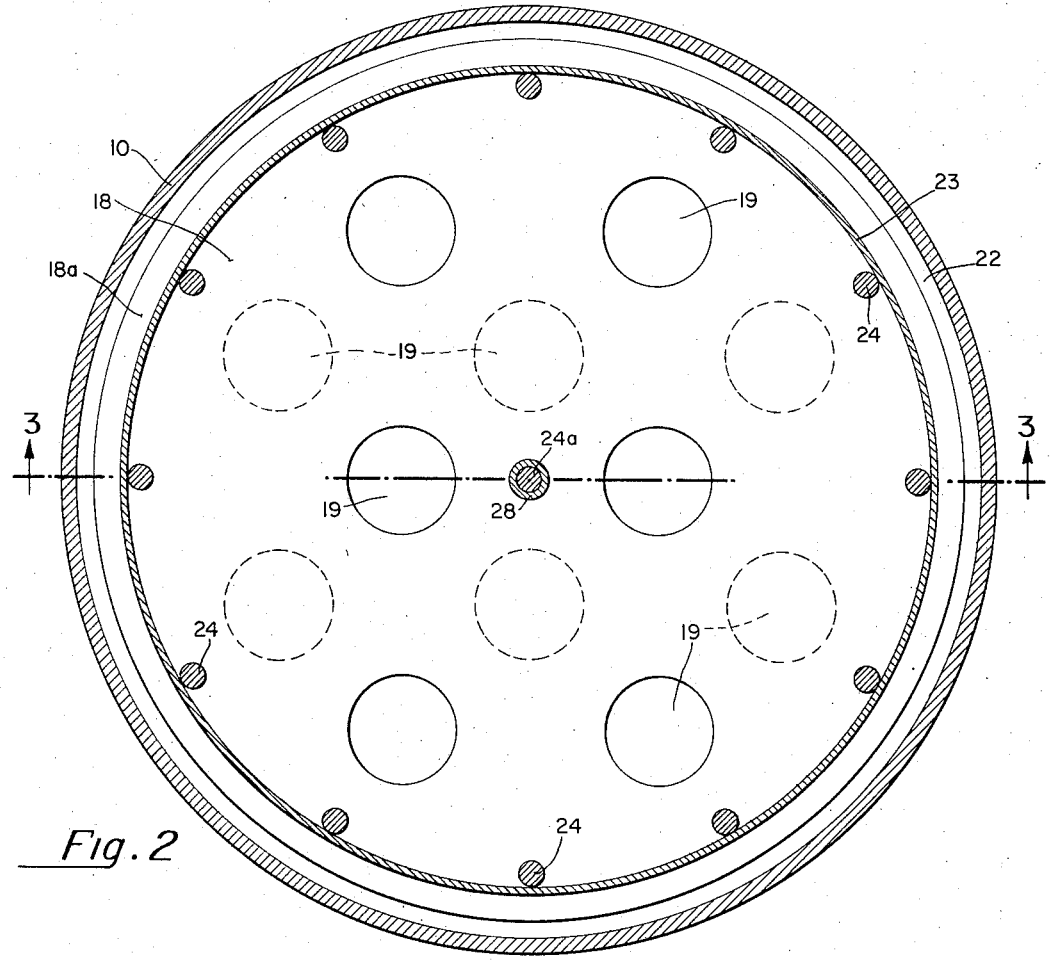
FIG. 2 is a horizontal cross-sectional view taken on line 2—2 of FIG. 1.

Referring now to FIG. 1 the reference numeral 10 refers to a cylindrical tower shell provided with a flanged cover 11 and a flanged bottom portion 12. Gas is admitted into the bottom of the tower through line 13 and leaves at the top through line 14. Liquid is admitted at the top of the tower through line 15 and distributing nozzle 16, and is withdrawn from a sump at the bottom of the tower through line 17. The interior of the tower is provided with a series of superimposed horizontal plates 18 in closely spaced relationship. As may be best seen in FIGS. 2 and 3, the plates 18 are provided with a plurality of apertures 19 distributed uniformly over the surface of the plate, the apertures being horizontally offset from one another so that they occur in staggered relationship from one plate to the next. In the embodiment shown in the drawings, the apertures 19 in all of the plates are arranged in the same fashion. The staggered relationship of the apertures is obtained by rotating each alternate plate 90° with respect to its adjacent plate. This is best seen in FIG. 2 where the apertures in the next lower plate are shown in dotted lines, and the apertures in the plate above it are shown in full lines.

The apertures 19 in the embodiments shown are provided with downwardly extending chimneys 20. As explained in detail in U.S. Patent No. 3,075,752, the chimneys 20 greatly improve the efficiency of the tower by providing coordinated gas and liquid flow and bringing the gas and liquid into intimate contact on the surface of the plates that lie below the chimneys.

In the operation of the tower, liquid introduced through line 15 spreads over the surface of the horizontal plates, flows through the apertures 19 and down the chimneys 20 to the surface of the next plate whence it flows over the surface of that plate through the next series of apertures and so forth down through the tower. Gas, introduced through line 13, flows upwardly through the apertures, across the surface of the plate to the apertures in the next plate and so forth upwardly through the tower.

Figure 3:
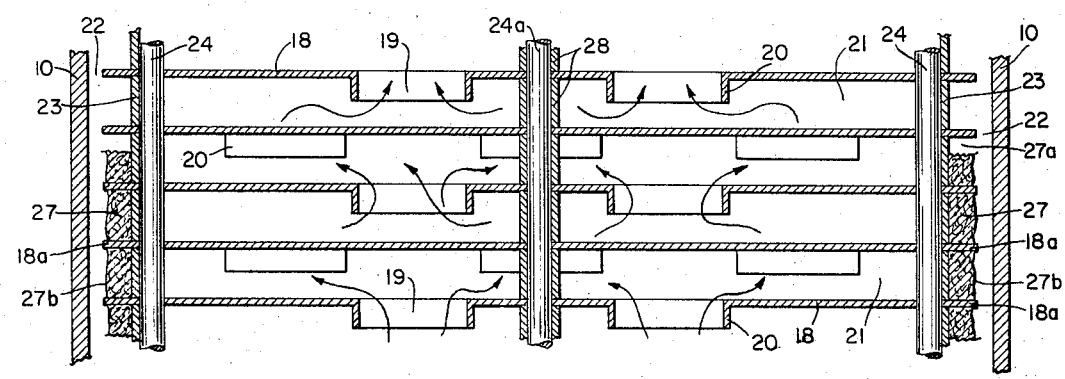
FIG. 3 is a vertical cross-sectional view taken on line 3—3 of FIG. 2.

The gas flow pattern is indicated by the arrows in FIGS. 1 and 3.

Since in plate assemblies of the design shown, the plates carry only a thin film of liquid, generally not over about ½" in depth and usually less, the plates may be constructed of relatively thin-gauge metal or other materials of the order of from 12 to 26 gauge (0.104 to 0.018 inch). The interplate spacing is quite close and will generally range from about ½" to not more than 6" and usually from about 1" to 3" vertical distance between plates.

In an arrangement of this type, a series of shallow chambers 21 are created between adjacent pairs of plates, and it is critically important to prevent the gas from flowing out of the chambers at the outer edges of the plates and bypassing along the inner wall of the tower shell 10. It is equally important to prevent the liquid from flowing off the edge of the plates and bypassing along the tower shell.

If it were practicable to construct the tower shell and the plates with sufficiently close tolerances that the plates fit snugly inside the tower with very little clearance, bypass could be prevented. However, the cost of providing tower shells machined to such close tolerances would be prohibitive; and in addition, provision would still have to be made for thermal expansion and contraction of the plates at a different rate than the tower shell so, in any case, some tolerance would be required from a practical standpoint. To provide such a tolerance, a spacing 22 (see FIGS. 2 and 3) is provided between the tower shell and the edges of the plates 18 to allow for such differential in thermal expansion and contraction, and to permit the plates to be inserted and removed from the tower shell without difficulty.

Means for sealing the chambers 21 at their periphery is provided in the form of ring-shaped members 23, preferably constructed of relatively thin-gauge metal, e.g. 10 to 22 gauge, and having a height equal to the desired vertical interplate spacing distance. As may be best seen in FIGS. 2 and 3, the ring-shaped members 23 are spaced slightly in from the periphery of the plates and completely enclose substantially the entire area of the plates, sealing off the periphery of each chamber 21 from gas and liquid flow, thus confining gas and liquid flow entirely to the apertures 19 as desired.

Passing through holes provided in the plates 18, a series of vertical rods 24 are provided. The rods 24 are preferably arranged so that they lie directly against or quite close to the ring-shaped members 23. The rods 24 pass through the entire plate assembly as may be best seen in FIG. 1, and are provided at their top and bottom portions with means, such as nuts 25, adapted to engage threaded end portions on the rods 24, which will clamp the entire assembly of plates 18 and ring-shaped members 23 into a tight unit which can be quickly and easily assembled and disassembled without damage to any of the parts. When the nuts 25 at the end of the rods are drawn up tight, clamping pressure is exerted between the surfaces of the plates and the upper and lower edges of the ring-shaped members 23. This forms a tight seal between the surfaces of the plates and the ring-shaped members 23 which prevents gas and liquid bypass while, at the same time, giving rigid support to the relatively thin-gauge plates and preventing any tendency to warp, buckle or undergo other forms of distortion.

If desired, a thin gasket may be used between the surfaces of the plates and the upper and lower edges of the liquid-tight seal. Any suitable gasketing material such ring-shaped members 23 to further insure a vapor and as resin-impregnated cork may be employed.

In the assembly shown, there are no welded connections between the plates and the tower walls, nor between the plates and the ring-shaped members 23 and rods 24. Assembly is accomplished merely by threading plates and ring-shaped members alternately over the supporting rods 24, merely dropping each in place and when completed, clamping the entire assembly together by applying the nuts 25 to the threaded ends of the rods. If desired, the entire stack may be pre-assembled outside the tower shell and then inserted into the tower shell as a unit. Any suitable means may be employed for supporting the plate assembly in the tower shell such as an L-shaped bracket 26 extending entirely around the inner surface at the bottom of the tower shell and supporting the plate assembly on the bottom portions of the rods 24 as shown in FIG. 1.

If desired, the outside of the plate assembly may be wrapped or packed with insulating and/or sealing material, such as asbestos rope, as indicated by reference numeral 27, in order to provide thermal insulation and/or to provide a further seal against liquid or vapor flow from the interior of the plate assembly. The overhanging edges 18a of the plates 18 provide ideal annular pockets 27a for retaining the insulating or packing material firmly in place. The insulation, being thus protected by the overhanging edges of the plates is not exposed to the usual wear and tear that it normally receives when applied to the exterior of a tower assembly, thus lasting longer. A further advantage of placing the insulation in the annular pockets 27a is that, in addition to the insulating effect of the insulation itself, the thin air space existing between the outer surfaces 27b of the insulation and the inner wall of the tower shell, created by the tolerance spacing 22 provided between the edges of the plates and the tower shell, affords additional insulating effect generally not available in towers of other types.

If desired, particularly in towers of large diameter, additional vertical rods such as rod 24a located in the center of the plate may be employed to provide additional support for the plates. Central rod 24a, which is omitted from FIG. 1 for the sake of clarity, is provided with spacing collars 28 (see FIGS. 2 and 3) having a height equal to the interplate vertical spacing distance. The collars 28 are slidably supported on rod 24a and are simply dropped in place between each pair of plates during assembly. The extremities of rod 24a are threaded and provided with nuts for clamping the plates and spacing collars 28 in a tight rigid assembly.

Figure 4:
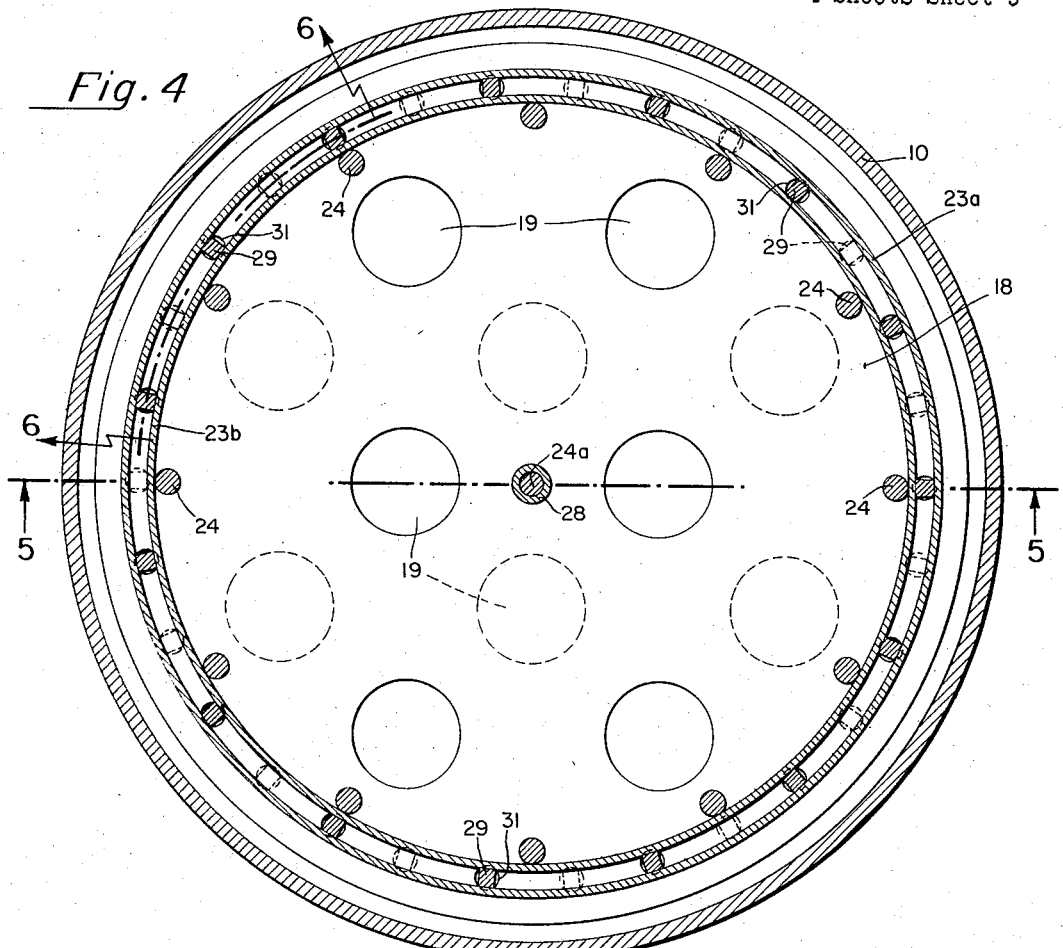
FIG. 4 is a horizontal cross-sectional view similar to FIG. 2 of a second embodiment of the invention.
Figure 5:
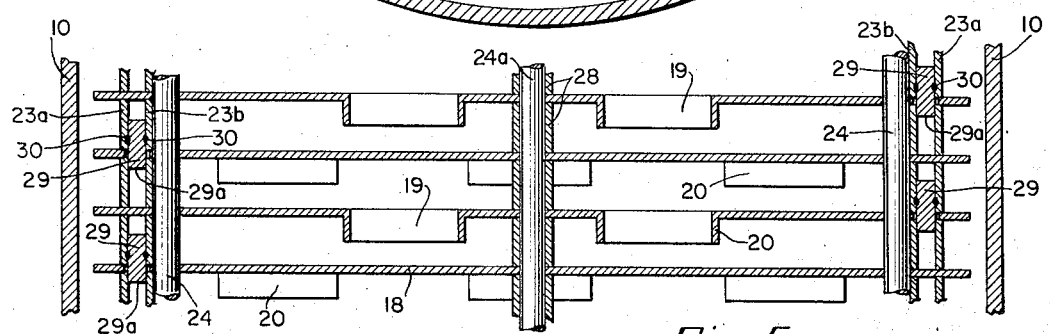
FIG. 5 is a vertical cross-sectional view taken on the line 5—5 of FIG. 4.
Figure 6:
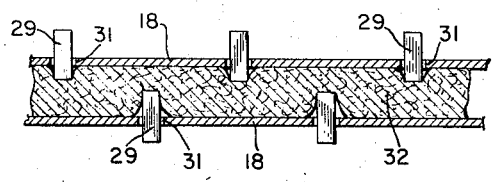
FIG. 6 is a view taken on line 6—6 of FIG. 4.

Reference is now made to FIGS. 4, 5 and 6 which show another embodiment of the invention. In FIGS. 4, 5, and 6, like reference numerals have been used to designate parts equivalent to those in FIGS. 1-3. In this embodiment, a pair of ring-shaped members consisting of an outer member 23a and an inner member 23b are employed, each having a height equal to the interplate vertical spacing distance, the two rings being fastened to one another through the agency of short pins 29 of rectangular cross-section which project a short distance below the lower edge of the two rings and which are attached to each of the rings, preferably by spot-welding as indicated at 30. (See FIG. 5.)

The contact plates 18 are provided with a series of holes 31 (see FIG. 6) for receiving the projecting ends 29a of the pins 29. The holes 31 in adjacent plates are staggered with respect to one another as best seen in FIG. 6.

As in the embodiment shown in FIGS. 1-3, a series of vertical rods 24 pass through holes provided in plates 18, the rods passing through the entire plate assembly and provided at each end with threaded end portions. In the embodiment shown, rods 24 are arranged on the inside of and immediately to the inner ring member 23b. When nuts are applied to the threaded end portions of rods 24, the entire assembly including plates 18 and the double ring provided by rings 23a and 23b fastened to one another by pins 29, is clamped into one tight unit with the upper and lower edges of the double ring clamped into tight contact with the surfaces of the plates. Preferably large washers are provided between the nuts and the topmost and bottommost plate to spread the clamping forces over to the outer ring 23a. If desired, the rods 24 may pass between the two rings, suitably placed holes being, in that case, provided in the plates 18 to receive them, or as a third alternative, the rods may pass through the plates on the outside of the outer ring 23a. As still another alternative, some of the rods 24 may be arranged on the inside of the double ring with others passing between the two rings and some on the outside of the two rings or any desired combination of these three alternatives. The essential aspect is that the rods be arranged close to the rings so that clamping forces applied on the ends of the rods are applied directly down on the ring members to provide a tight seal between the rings and the plates without bending the plates.

An advantage of the double-ring construction as shown in the embodiment of FIGS. 4–6 is that packing or insulating material may be inserted into the space between the two rings to provide thermal insulation and/or additional seal against gas and liquid flow. For example, stranded material such as asbestos rope 32 may be laid in the space between the two rings as shown in FIG. 6. When assembled, the projecting portions of pins 29 serve to compress the packing or insulating material tightly in the space between the two rings as indicated in FIG. 6. In this arrangement, the insulating material is completely protected from abrasion or other types of wear and tear.

The double-ring construction shown in FIGS. 4–6 is particularly advantageous in towers of relatively large diameter, for example of 36 inches or more, where a single ring as shown in FIGS. 1–3 might have a tendency to buckle from the clamping pressures necessary to hold the assembly together and provide a tight seal between the rings and the plate surfaces. The double ring shown in FIGS. 4–6, reinforced by the pins 29 which fasten the two rings together into a single unit, will resist much greater clamping pressures before any buckling can occur.

Still another advantage of the embodiment shown in FIGS. 4–6 is that the projecting ends 29a of the pins 29 engaging holes 31 provided in the plates serve to locate the rings accurately on each plate so as to insure that they are each positioned directly one above the other in the finished assembly.

Figure 7:
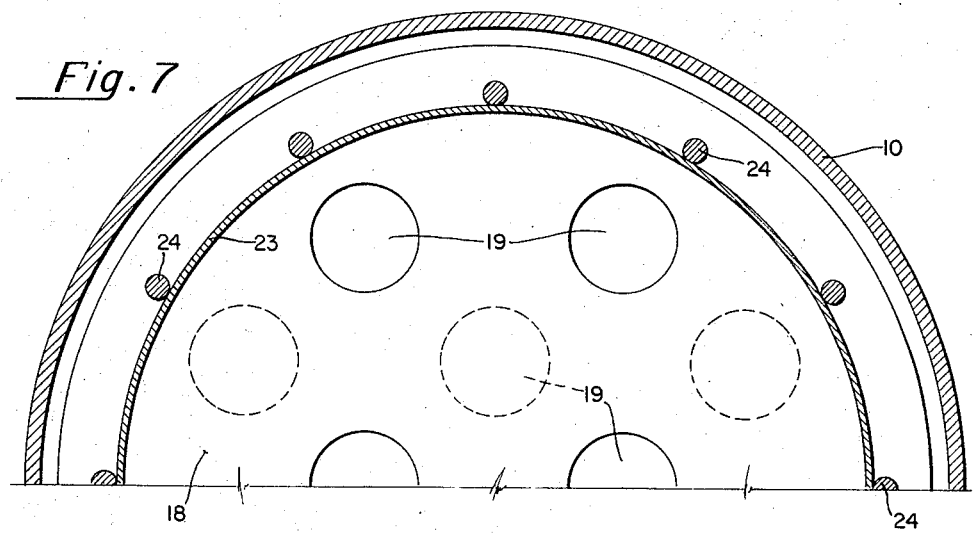
FIG. 7 is a horizontal cross-sectional view similar to FIG. 2 showing another embodiment of the invention.

Reference is now made to FIG. 7 which shows another embodiment of the invention similar in all respects to that of FIGS. 2 and 3 except that the ring-shaped member 23 is located on the inside of vertical rods 24 rather than on the outside as shown in FIGS. 2 and 3. Locating the rods on the outside of the ring member 23 may be desirable in some applications where it is wished to avoid any liquid flow down the rods as will tend to occur to some slight extent where the rods are located inside the ring member and do not fit snugly in the holes provided for them in the plates. Another instance where it may be desirable to have the functional area of the plates (i.e. the area inside the ring member 23) free from rods is where the liquid to be processed carries some suspended solids. In such a case the intersections of the rods and the plates may provide centers where fouling and accumulation of solids could occur with resulting contamination of the liquid. A plate with its functional area free from obstacles is thus particularly suitable for processing liquids carrying suspended solids.

Figure 8:
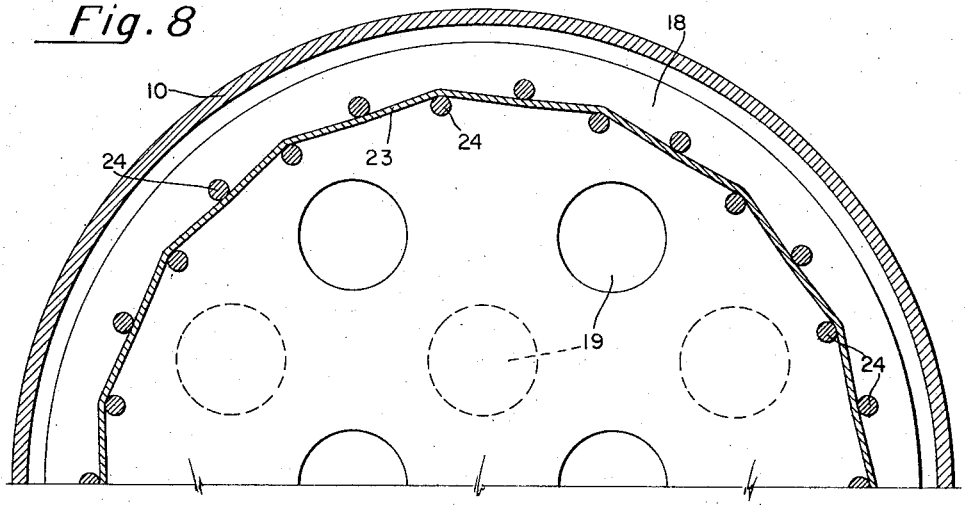
FIG. 8 is a horizontal cross-sectional view taken similar to FIG. 2 showing still another embodiment of the invention.

Referring now to FIG. 8 showing still another embodiment of the invention, in this case the ring-shaped member 23 is laced between a series of vertical rods 24 which are offset from one another by a distance which is slightly less than the thickness of the ring-shaped member 23 such that the member 23 is slightly deformed, and held tightly between the vertical rods 24 when it is slid down between the rods during assembly and pushed firmly in contact with the surface of the plate 18 when clamping forces are applied by tightening of the nuts at the extremities of the vertical rods 24. This arrangement of the ring 23 has the advantage of substantially increasing the resistance of the ring to buckling under clamping pressure applied by tightening nuts on the ends of the rods 24 or by other means, and thus permits the use of a single ring on towers of larger diameter.

Figure 9:
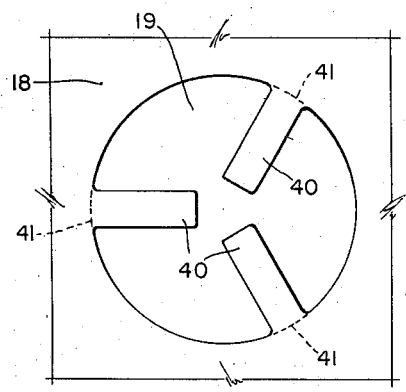
FIG. 9 is a plan view showing construction details of a type of chimney construction for use in connection with contact plates shown in FIGS. 1–8.
Figure 10:
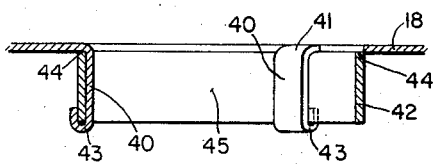
FIG. 10 is a cross-sectional view showing the finished chimney construction shown in partially completed form in FIG. 9.

Reference is now made to FIGS. 9 and 10 which show a preferred type of construction for the chimney elements 20. FIG. 9 shows the first step in the fabrication of the chimney construction shown in finished form in FIG. 10. In the first step, an aperture 19 is punched out of the plate 18, the punching dye being so shaped as to leave 3 prongs 40 projecting radially inwardly toward the center of the circular aperture 19. In the second step in the operation of forming the finished chimney element shown in FIG. 10, the prongs 40 are bent downwardly along dotted lines 41 to a position at right angles with the surface of the plate. A circular skirt 42 having an inside diameter very slightly larger than the diameter of the aperture 19 is then slipped over the 3 downwardly projecting prongs 40, after which the ends of the prongs are bent around the bottom edge of the skirt 42 as shown at 43 in such manner as to maintain the upper edge 44 of the skirt 42 in snug engagement with the bottom surface of the plate. Liquid overflowing the edge of the apertures 19 flows down the inner surface 45 of the skirt 42. The length of the skirt 42 will depend upon the desired length of the chimneys 20 which, in most cases, will range from about ½ to ⅓ of the inter-plate spacing distance.

The chimney construction shown in FIGS. 9 and 10 has the important advantages of simplicity and economy of construction. If desired, the pre-punched plates 18 may be shipped to the assembly site with the prongs 40 flat. The chimneys may then be quickly constructed on the site by connecting the separate skirt elements 42 to the plates by means of the prongs in the manner shown. If for any reason it is desired to change the length of the chimneys, this may be readily accomplished by straightening the prongs, removing the skirt 42, and replacing it by a skirt of different length.

Figure 11:
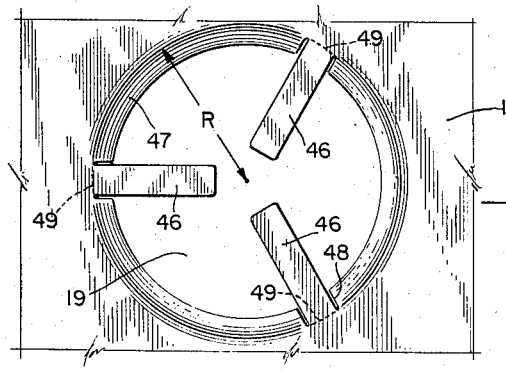
FIG. 11 is a plan view showing construction details of a slightly modified type of chimney construction for use in connection with contact plates shown in FIGS. 1–8.
Figure 12:
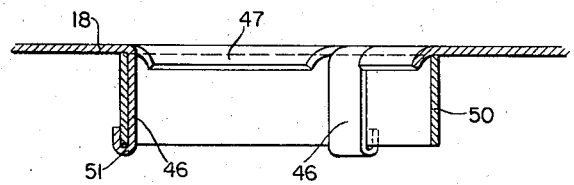
FIG. 12 is a cross-sectional view showing the finished chimney construction shown in partially completed form in FIG. 11.

Reference is now made to FIGS. 11 and 12 which show the same general type of chimney construction shown in FIGS. 9 and 10, but modified so as to provide a lip overhanging the skirt element. In FIG. 11, which shows the first step in the production of the finished chimney element shown in FIG. 12, the plate 18 is die-punched to provide an aperture 19 leaving 3 prongs 46 extending radially inwardly toward the center of the aperture 19. In this same die-punching operation, a depressed lip 47 is formed. The prongs 46 extend back into the lip portion as indicated at 48. The next step in forming the finished chimney is to depress the prongs 46 downwardly along dotted lines 49 to a position at right angles with plate 18. A circular skirt 50 having a radius just slightly greater than radius R (see FIG. 11) is then slipped over the outside of the 3 prongs 46 and the ends of the 3 prongs are then bent over the bottom edge of the skirt 50 as shown at 51 so as to hold the upper edge of the skirt 50 in firm engagement with the bottom surface of the plate 18.

The embodiment shown in FIGS. 11 and 12 is advantageous when it is desired to eliminate the possibility of liquid entering the joint between the top of the skirt and the bottom surface of the plate and flowing down the outside of the skirt and/or along the bottom surface of the plate.

Figure 13:
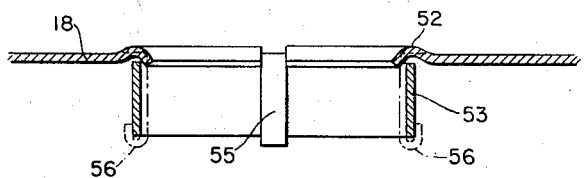
FIG. 13 shows another modified form of chimney construction.

FIG. 13 shows a construction made according to the procedures illustrated in FIGS. 11 and 12 except that in the die-punching operation a raised annular portion 52 is formed which creates a weir around the aperture which assures the existence of a shallow liquid layer on the plate at all times. The skirt 53 fits into the depression formed on the underside of the plate, and the prongs 55 support the skirt 53 against the under surface of the plate by means of the bent-over end portions 56.

Figure 14:
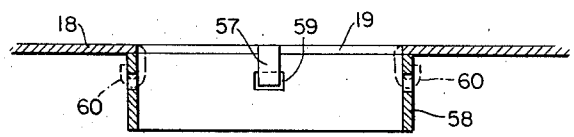
FIG. 14 shows still another modified form of chimney construction.

FIG. 14 shows a modified type of construction wherein, in the punching operation, shorter prongs 57 are formed. In this construction, the skirt 58 having an inside diameter the same as the diameter of the aperture 19, is provided with holes 59 to receive the bent-over ends of the prongs 57 as indicated at 60. The bent-over portions 60 maintain the skirt 58 in snug engagement with the under surface of the plates.

Figure 15:
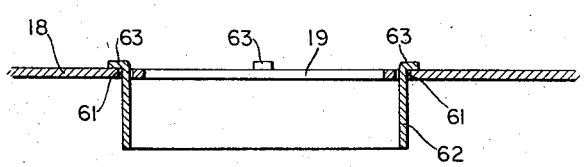
FIG. 15 shows a still further modified form of chimney construction which may be employed with the contact plates shown in FIGS. 1–8.

FIG. 15 shows still another alternative chimney construction where, instead of employing prongs formed as an integral part of the plate as in the embodiment shown in FIGS. 9–14, a circular aperture 19 is punched in the plate while, in the same punching operation, slots 61 are punched slightly back from the edge of the aperture. A circular skirt 62 is provided having lugs 63 attached to its upper edge. The lugs 63 are inserted into the slots 61 and then bent over the upper surface of the plate as shown.

While it is preferred to employ plates having chimney elements as illustrated in the drawings, particularly of the type shown in FIGS. 9–15, it is to be understood that the chimney elements 20 may be omitted, if desired, such that the plates are merely provided with staggered apertures. Likewise, instead of staggered apertures as illustrated in the embodiment shown, the closely spaced plates may instead be provided with a multitude of relatively small perforations accommodating both the flow of gas and liquid, the particular type of arrangement of the gas and liquid openings in the plates not being an essential feature of the present invention.

The gas-liquid contact tower provided by the present invention may be employed in any application involving gas-liquid contact, particularly in countercurrent fashion. It may be applied, for example, in gas-liquid absorption processes, particularly where low liquid rates and relatively high gas rates are desired such as in air conditioning where large quantities of air must be kept in contact with relatively small quantities of desiccant solution to dehumidify the air. The gas-liquid contact device of the invention may likewise be employed for distillation, in particular vacuum distillation, or in any related type of gas-liquid contacting process.

I claim:

1. Gas-liquid contact tower comprising an outer tower shell, a plurality of superimposed, relatively thin-gauge, flat, horizontal plates for carrying a thin film of liquid arranged within said tower shell, said horizontal plates being vertically spaced apart in close proximity to one another to provide a series of shallow, horizontal chambers from ½ inch to 6 inches in depth, said horizontal plates being provided with a plurality of apertures relatively large in size and relatively few in number, said apertures being distributed uniformly over the surface of said plates, said apertures permitting the thin liquid film on said plates to flow downwardly through said apertures from plate to plate and permitting gas to flow upwardly from plate to plate through said apertures, means for supporting said plates in vertically spaced apart relationship and for sealing the periphery of the chambers defined thereby against gas and liquid bypass along the inner wall of said tower shell, said means comprising ring-shaped members from one-half inch to 6 inches in height disposed between said plates having a diameter slightly less than the diameter of said plates and a height equal to the interplate spacing, a plurality of holes in said plates spaced radially inwardly from but adjacent to the periphery of said plates and closely adjacent to said ring-shaped members, said holes being located on the inner side of said ring-shaped members, said ring-shaped members comprising two closely spaced ring elements fastened to one another by a plurality of pins sandwiched between said ring elements and having portions projecting beyond at least one edge of said ring elements, said projecting pin portions engaging holes provided in said plates, a plurality of vertical rods passing through the holes in said plates located on the inner side of said ring-shaped members and extending through the entire assembly of plates and ring-shaped members, means provided on the extremities of said rods to clamp the superimposed layers of plates and ring-shaped members into a rigid, self-supporting assembly, fluid-tight in its lateral portions, the periphery of said plates being spaced from the inner wall of said tower shell to provide sufficient clearance to permit the entire assembly of plates, rods, and ring-shaped members to be inserted into and removed from said tower shell as a self-sustaining unit.

2. Gas-liquid contact tower in accordance with claim 1 in which insulating material is inserted in the space between the two ring elements whereby said insulating material is compressed by the projecting portions of said pins.

3. Gas-liquid contact tower comprising an outer tower shell, a plurality of superimposed, relatively thin-gauge, flat, horizontal plates for carrying a thin film of liquid arranged within said tower shell, said horizontal plates being vertically spaced apart in close proximity to one another to provide a series of shallow, horizontal chambers from ½ inch to 6 inches in depth, said horizontal plates being provided with a plurality of apertures relatively large in size and relatively few in number, said apertures being distributed uniformly over the surface of said plates, said apertures permitting the thin liquid film on said plates to flow downwardly through said apertures from plate to plate and permitting gas to flow upwardly from plate to plate through said apertures, means for supporting said plates in vertically spaced apart relation and for sealing the periphery of the chambers defined thereby against gas and liquid bypass along the inner wall of said tower shell, said means comprising ring-shaped members from ½ inch to 6 inches in height disposed between said plates having a height equal to the interplate spacing, and a diameter slightly less than the diameter of said plates, whereby the outer edges of said plates projecting beyond said ring-shaped member form annular pockets, said pockets being packed with insulating material, a plurality of holes in said plates spaced radially inwardly from, but adjacent to the periphery of said plates and closely adjacent to said ring-shaped members with at least some of said holes being located on the inner side of said ring-shaped members, a plurality of vertical rods passing through said holes and extending through the entire assembly of plates and ring-shaped members, means provided on the extremities of said rods to clamp the superimposed layers of plates and ring-shaped members into a rigid, self-supporting assembly, fluid-tight in its lateral portions, the periphery of said plates being spaced from the inner wall of said tower shell to provide sufficient clearance to permit the entire assembly of plates, rods, and ring-shaped members to be inserted into and removed from said tower shell as a self-sustaining unit.

References Cited

UNITED STATES PATENTS

| 1,598,601 | 9/1926 | Casper | 99—44 |
| 1,748,409 | 2/1930 | Campbell | 261—114 |
| 3,013,782 | 12/1961 | Glitsch. | |
| 3,037,754 | 6/1962 | Glitsch. | |
| 3,075,752 | 1/1963 | Leva | 261—113 |
| 3,262,684 | 7/1966 | Smith | 261—114 |

HARRY B. THORNTON, *Primary Examiner.*

E. H. RENNER, *Assistant Examiner.*